Patented Apr. 16, 1935

1,998,144

UNITED STATES PATENT OFFICE 1,998,144

BEARING AND COMPOSITION SUITABLE THEREFOR

Charles F. Noftzger, Chicago, Ill.

No Drawing. Application September 28, 1932, Serial No. 635,227

13 Claims. (Cl. 308—242)

The main objects of this invention are:

First, to provide an improved material for bearings which permits high speed without becoming heated and slight wear on the bearing or coacting part.

Second, to provide a bearing which requires very little lubrication and runs for a long time after being once lubricated.

Third, to provide a bearing of this character which is durable, strong, economical to manufacture, and efficient in use.

Objects relating to details and economies of my invention will appear from the description to follow. The invention is defined and pointed out in the claims.

My improved bearing material is molded and consists of finely divided metal, finely divided mineral of the muscovite group, wax and a binder.

The metal or metals are introduced in a pulverulent or finely divided state and serve to conduct heat from the bearing surface. Some of the metals that I prefer to use either alone or in combination are: lead, zinc, babbitt, bronze and the like.

The mineral which I prefer to use is a variety of muscovite having a silky luster, commonly called sericite. This mineral is finely divided by grinding or otherwise before being mixed with the other materials.

The wax which I prefer to use is carnauba wax, although any material having substantially the same qualities might be used. The wax facilitates the manufacture and molding of the bearing and serves to counteract, in a measure, the abrasive qualities of the other ingredients, such as the phenolic resin, when such is used as the binding material.

The cotton flock is used in small quantities, and it is particularly desirable where the bearing is in the form of a thin shell or bushing.

Any desired binder may be used, but I prefer to use an infusible phenolic condensation product, such as phenolic resin. The binder is dissolved in alcohol or other solvent before being used with the other parts of the composition.

The wax is melted and mixed with the sericite or other suitable mineral of this character, the sericite being in powdered or comminuted form. This mixture is thoroughly cooled and then pulverized in a grinding machine and mixed with the powdered metal and the dissolved resin or other binder. The resulting mixture is then subjected to heat to eliminate the solvent by evaporation, after which the resulting mass is reduced to pulverulent form by grinding. At this stage, the mixture has the appearance of fine sand and is ready to be molded in the form of the bearing.

The component parts in the following formula have proved satisfactory for a bearing requiring slight lubrication:

| | Percentage by weight |
|---|---|
| Finely divided metal, such as lead or babbit | 60% |
| Sericite | |
| Wax, for example, carnauba | 40% |
| Phenol binder | |

In the above formula, the sericite or like mineral employed preferably constitutes 15% to 20% of the 40%.

By the term "metal", I include all metals that are satisfactory for bearing purposes. By the term "mineral", I include minerals of the muscovite group, such as sericite, which are satisfactory for my purpose. A bearing made in accordance with my invention requires lubrication only in a small amount and then only after long intervals of time.

The method I use in preparing the present molding material is claimed in my copending application, Serial No. 592,659, filed February 12, 1932.

Having thus described my invention, what I claim as new and desire to secure by Letters Patent, is:

1. A bearing material in the form of fine sand and capable of being molded under heat and pressure, containing in composition powdered muscovite, a bearing metal, wax, and resin, the muscovite by weight being less than 56% of the whole.

2. A bearing material in finely divided form and capable of being molded, containing in composition sericite, bearing metal, wax, and a binder, the sericite being substantially 7% by weight of the whole.

3. A moldable material in the form of finely divided particles having the appearance of sand and containing in composition muscovite, bearing metal, wax, and a binder, the muscovite being between 5% and 8% of the whole.

4. A moldable material in the form of finely divided particles containing in composition substantially 60% by weight of bearing metal and 40% by weight of sericite, wax, and a phenol binder, the sericite constituting 15% to 20% of the 40%.

5. A moldable material in the form of finely divided particles containing in composition substantially 60% by weight of bearing metal and 40% by weight of sericite, wax, and a phenol binder.

6. A composition bearing consisting of a finely divided bearing metal, such as lead or babbitt, a powdered muscovite, wax, such as carnauba wax, and a binder, the muscovite comprising 6% to 8% of the total by weight.

7. A composition bearing consisting of a finely divided bearing metal, a powdered sericite, wax, and a binder, the metal constituting substantially 60% and the sericite 7% by weight of the whole.

8. A bearing material consisting of, by weight, substantially 60% bearing metal, 7% sericite, and 33% flock, wax, binder, and foreign matter.

9. A molded material comprising sericite, bearing metal dust, wax, resin, and cotton flock.

10. A bearing material comprising finely divided sericite, a finely divided bearing metal, wax, and a binder such as phenol resin.

11. An anti-friction material consisting of pulverulent sericite, pulverulent lead, carnauba wax, and a phenolic resin binder.

12. An article of manufacture consisting of pulverized sericite, a pulverized bearing metal, wax, and a phenolic binder.

13. An anti-friction material consisting of pulverulent sericite, pulverulent lead, wax, and a resin binder.

CHARLES F. NOFTZGER.